United States Patent [19]

Lee

[11] Patent Number: 4,975,207

[45] Date of Patent: Dec. 4, 1990

[54] IMPACT MODIFIED POLYURETHANE BLENDS

[75] Inventor: Biing-lin Lee, Broadview Heights, Ohio

[73] Assignee: The B. F. Goodrich Company, Akron, Ohio

[21] Appl. No.: 226,589

[22] Filed: Aug. 1, 1988

[51] Int. Cl.$^5$ .......................... C08L 75/04; C08K 3/40
[52] U.S. Cl. ....................................... 524/494; 525/66
[58] Field of Search ........................... 524/494; 525/66

[56] References Cited

U.S. PATENT DOCUMENTS

| | | | |
|---|---|---|---|
| 3,272,890 | 9/1966 | O'Leary, Jr. ........................ | 525/130 |
| 4,342,847 | 8/1982 | Goyert et al. ........................ | 525/66 |
| 4,423,185 | 12/1983 | Matsumoto et al. .................. | 525/66 |
| 4,500,671 | 2/1985 | Goyert et al. ........................ | 525/66 |
| 4,883,837 | 11/1989 | Zabrocki .............................. | 525/66 |

OTHER PUBLICATIONS

"Handbook of Thermoplastic Elastomers", edited by Benjamin M. Walker, Chapter 5, p. 244, Thermoplastic Polyurethane Elastomers (Van Nostrand Reinhold Co., 1979).

*Primary Examiner*—Ana L. Carrillo
*Attorney, Agent, or Firm*—James R. Lindsay; Daniel J. Hudak; Nestor W. Shust

[57] ABSTRACT

Impact resistant properties, especially at low temperatures, melt processing properties, and dimensional stability of thermoplastic elastomer polyurethanes are improved by the addition of a carbonyl modified polyolefin. These improvements are particularly useful for reinforced polyurethanes.

17 Claims, No Drawings

IMPACT MODIFIED POLYURETHANE BLENDS

FIELD OF THE INVENTION

The present invention relates to thermoplastic polyurethane blends and composites having improved impact properties such as low temperature toughness, improved melt processability, and dimensional stability. These improvements are achieved by the use of a carbonyl modified polyolefin impact modifier using high shear blending equipment such as a twin screw extruder.

BACKGROUND ART

Heretofore, uncured or non-crosslinked polyurethanes having hard segments therein such as made from toluene diisocyanate or methylene bispphenyl diisocyanate have had good physical properties However, as the rigidity of the thermoplastic polyurethane elastomer increases, the low temperature toughness becomes poor. Although thermoplastic polyurethane elastomers have been blended with a variety of polymers, blending with carbonyl modified polyolefins for improved low temperature toughness has been unknown since the same are not compatible with polyurethanes. For example, the Handbook of Thermoplastic Elastomers, edited by Benjamin M. Walker, Chapter 5, Thermoplastic Polyurethane Elastomers, page 244, Van Nostrand Reinhold Co., 1979, states that color concentrates in low-density polyethylene can be added to polyurethane. However, the amount of the low density polyethylene is utilized in levels of less than three percent since they effect polymer properties and processing.

Heretofore, carbonyl modified polyolefins have been made and have generally been utilized as coupling agents for glass fiber reinforced polypropylene, as a melt adhesive and as a tie layer for coextrusion of polyolefin with aluminum foil.

U.S. Pat. No. 3,272,890 to O'leary relates to a blend composition containing a very high amount of a polyolefin, for example in excess of 75 percent by weight, and a very low amount of a low hardness polyurethane, for example less than 25 percent by weight.

SUMMARY OF THE INVENTION

Blends of a thermoplastic polyurethane elastomer and an carbonyl modified polyolefin are produced by blending the two components with a high shear mixer such as a twin screw extruder. The thermoplastic polyurethane elastomer has improved properties such as impact resistance, particularly low temperature toughness, lower melt processing temperatures, generally increased flex modulus, and improved flex strength. The amount of carbonyl modified polyolefin is generally from about 1 part to about 30 parts by weight for every 100 parts by weight of the thermoplastic polyurethane elastomer. The carbonyl modified polyolefin is generally a homopolymer or a copolymer made from 1 or more monomers having from 2 to 6 carbon atoms with the carbonyl group having from 1 to 8 carbon atoms. The polyurethane blends of the present invention can contain reinforcing agents such as glass fiber and produce products which have a smooth, glossy finish.

DETAILED DESCRIPTION OF THE INVENTION

The present invention relates to a blend of a thermoplastic elastomer polyurethane and an impact modifier. The blend can be used to produce heat molded products for automotive applications including for example automotive body side moldings, fender extensions, and rocker panels. A reinforcing agent can be added to the blend to yield a polyurethane composite for similar applications.

The polyurethane blends or composites of the present invention generally comprise a thermoplastic elastomer polyurethane, an impact modifier, optionally reinforcing agents such as fibers, talc, etc., and optionally fillers such as mineral fillers, pigment fillers, and the like.

According to the concepts of the present invention, a thermoplastic elastomer polyurethane is utilized. That is, the polyurethanes of the present invention have soft segments or intermediate portions such that the entire polyurethane is generally elastomeric. Any conventional type of polyurethane which is elastomeric can hence be utilized including those known to the art and to the literature. Preferably, the polyurethane is made from a low molecular weight polyester intermediate. Such polymers are well-known and are commercially available. Such types of polymers are also described in Bruins, *Polyurethane Technoloogy*, Interscience Publishers, page 198–200, 1969, as well as in *Modern Plastics Encyclopedia*, Vol. 52, No. 10A, 1975, at page 84.

The preferred thermoplastic elastomer polyurethanes of the present invention are preferably free of crosslinking agents and hence are not crosslinked and also generally do not contain any free isocyanate groups therein. A preferred type of polyurethane is made from an intermediate which desirably is a polyester intermediate made by the condensation reaction of a dicarboxylic acid having from 2 to about 10 carbon atoms with a polyol such as a glycol having from 2, that is ethylene glycol, to about 10 carbon atoms. Specific examples of dicarboxylic acids include malonic acid, succinic acid, glutaric acid, adipic acid, pimelic acid, sebacic acid, suberic acid, azelaic acid, maleic acid, and the like. The molecular weight of the polyester intermediate is generally low as from about 500 or 600 to about 1,200 or 1,500. The polyisocyanates utilized are generally aromatic diisocyanates such as triphenylmethane-p-p'-diisocyanate, and the like, as well as the various diphenyl diisocyanates such as diphenyl methane diisocyanate, dichlorodiphenyl methane diisocyanate, diphenyl dimethyl methane diisocyanate, paraphenylene diisocyanate, meta-phenylene diisocyanate, naphthalene-1,5-diisocyanate, meta-tolylene diisocyanate, and the like. The ratios of the various components to one another are important in order to produce a polyesterurethane elastomer substantially free of crosslinks and the like. Examples of such polyester intermediates are set forth in U.S. Pat. Nos. 2,770,612 and 2,871,218 to Schollenberger, which are hereby fully incorporated by reference.

Another type of thermoplastic elastomer polyurethane is made from phthalic acids which are reacted with saturated glycols containing from 3 to about 10 carbon atoms to produce a polyester intermediate having a molecular weight of from about 250 to about 2,500. The polyester intermediate is reacted generally with any type of aromatic diisocyanate known to the art with representative examples including para-phenylene diisocyanate, 4,4'-bibenzyl diisocyanate, dianisidene diisocyanate, meta-phenylene diisocyanate, tolylene diisocyanate, bitolylene diisocyanate, and the like. Such a polyurethane is free from crosslinks and generally contains no free isocyanate groups therein. A more detailed description of such types of polyester urethanes is set forth in U. S. Patent No. 3,015,650 to Schollenberger which is hereby fully incorporated by reference.

Still other types of suitable thermoplastic elastomer polyurethanes which can be utilized are those obtained by reacting a long chain polyester intermediate having a molecular weight of from about 400 to about 10,000, preferably from about 800 to about 6,000 with a polyisocyanate, preferably a diisocyanate, and a chain extender having a molecular weight up to about 400. Preferred chain extenders include short-chain polyols having a molecular weight of up to about 380. The equivalent ratio of isocyanate groups to the hydroxyl groups is from about 0.9 to about 1.1 and preferably from about 0.98 to about 1.04. Hence, these types of polyesters generally have a higher molecular weight than the above-described type. Such elastomer polyester urethanes have a Tg of 0° C. or less and preferably from about minus 10° C. to about minus 55° C. Such polyesters are set forth in U.S. Pat. Nos. 4,397,974 and 4,542,170 which is hereby fully incorporated by reference.

Yet another type of a thermoplastic elastomer polyurethane which can be utilized in the present invention and which is substantially free from crosslinks is made from a poly(oxyalkylene) polyol with the alkylene group containing from 3 to 6 carbon atoms. This is reacted with an aliphatic glycol containing from 4 to 12 carbon atoms, with from 4 to 6 carbon atoms being preferred. The polyester intermediate generally has a low molecular weight of from about 800 to about 4,000. Such a polyester intermediate is reacted with a diphenyl diisocyanate such as diphenyl methane diisocyanate, diphenyl methane-p,p'-diisocyanate, dichlorodiphenyl methane diisocyanate, dimethyl diphenyl methane diisocyanate, bibenzyl diisocyanate, bitolylene diisocyanate, and the like. Essentially no free unreacted isocyanate remains within the reaction product. A more detailed description of this preferred type of elastomeric polyurethane is set forth in U.S. Patent No. 2,899,411 to Schollenberger which is hereby fully incorporated by reference.

Generally, it has been found that improved low temperature impact resistance is obtained when the thermoplastic polyurethane elastomer has a Shore D hardness of at least 40 and preferably at least 50.

The impact modifiers of the present invention are used in a range of about 1 to about 30 parts, and desirably from about 1 to about 20, and preferably from about 5 to about 15 parts by weight per 100 parts by weight of the polyurethane. The impact modifier is added in an effective amount to improve the impact resistance and especially the low temperature toughness of the polyurethane. By improvement of low temperature toughness, it is meant that the Izod impact strength at −30° C. can be improved according to ASTM D256. Another improvement is that melt processability is improved such that the shear viscosity of the polyurethane is reduced as a result of a lowering of the melt processing temperature and further that this reduction is achieved without causing a non-cohesive external skin to form on a heat formed product.

The impact modifiers of the present invention are particularly useful when added to polyurethane blends which include a reinforcing agent and/or a filler. In the past, when a reinforcing agent has been added to polyurethane, the impact resistance, especially at low temperatures or at room temperature, has been poor as has been the melt processability of the resultant composite. Thus, the impact modifiers of the present invention are useful with reinforced polyurethanes to improve impact resistance, melt processability and to produce polyurethane composites having improved dimensional stability. By improved dimensional stability an improvement in one or more of the following characteristics is meant: flexural modulus, flexural strength, tensile yield strength and heat distortion temperature. When used with reinforced polyurethanes, the amount of the impact modifier can be the same as the amount used for unreinforced polyurethanes.

The impact modifier of the present invention is a carbonyl modified polyolefin. More specifically, it is a graft copolymer containing a polyolefin backbone with pendant carbonyl containing compounds. Based upon the entire weight of the graft copolymer, the amount of the polyolefin is from about 90 percent to about 99.9 percent, desirably from about 93 percent to about 98 percent, and preferably from about 95 to about 98 percent by weight. Suitable graft copolymers have a melt index of from about 1 to about 20; desirably from about 1 to about 10; and preferably from about 1 to about 5.

The polyolefin component of the impact modifier (i.e. graft copolymer) is a homopolymer or a copolymer made from one or more monomers having from about 2 to about 8 carbon atoms; and desirably 2 or 3 carbon atoms. Specific examples of suitable polyolefins include the homopolymer of ethylene, propylene, or isobutylene, copolymers of propylene and ethylene, and of ethylene-propylene-diene monomers with the diene having from 4 to 8 carbon atoms. Suitable ethylene polymers for modification include high density polyethylene, low density polyethylene, and linear low density polyethylene. When a copolymer is utilized, the amount of the ethylene monomer utilized and hence the amount of the ethylene repeating unit in the copolymer can vary considerably as from about 1 percent to about 50 percent, desirably from about 3 percent to about 25 percent, with approximately 10 percent by weight being preferred.

The impact modifier includes from about 0.1 to about 10 percent, desirably from about 0.2 to about 7 percent, and preferably from about 0.2 to about 6 percent by weight of a carbonyl containing compound having straight or branches $C_1$–$C_8$ aliphatic or preferably an alkyl group. Specific examplesof suitable carbonyl containing substituents including carboxylic acids such as formic fumaric acid, or maleic acid, or anhydrides such as maleic anhydride, fumaric anhydride, and the like, with maleic anhydride being preferred.

The impact modifiers are commercially available and can be manufactured in accordance with the processes set forth in *Encyclopedia of Polymer Science and Engineering,* John Wiley & Sons, 1987 (Vol. 9, pp. 275–277) which is hereby incorporated by reference as is fully set forth herein.

Optionally, reinforcing agents can be added to the blends of polyurethane and carbonyl modified polyolefin to improve the dimensional stability. The reinforcing agent is added in an amount of from about 1 to about 50 parts, desirably from about 10 to about 40 and preferably from about 15 to about 30 parts by weight per parts by weight of polyurethane.

The reinforcing agents which are used in the polyurethane blends of the present invention include those reinforcing agents known in the art but in particular include fibers. Suitable fibers include glass, carbon, and graphite fibers, polyester, nylon, and the like. However, it should be understood that any high melting fibers, i.e., having a melting point greater than about 260° C. can be utilized. It is desirable in this invention to use fibers having a diameter of from about 10 to about 20 microns and a length from about 0.1 to about 1.0 inch; and preferably from about 0.2 to about 0.6 inch. A particularly we.1.1 suited reinforcing agent is glass fiber having a length from about 0.10 to about 1.0 inch and preferably from about 0.20 to about 0.60 inches such as sold under the Fiberglass trademark and made by the Owens-Corning Fibers and having a conventional sizing agent such as an organoaminosilane.

Fillers which can be used in the invention include those fillers known in the art, such as carbon black, pigments such as titanium dioxide, calcium carbonate, mineral fillers such as silica, and the like. The fillers can be used in amounts of from about 0 to about 40, desirably from about 0 to about 35, and most desirably from about 0 to about 20 parts by weight based on 100 parts by weight of the polyurethane.

In addition to the above, other conventional additives can be added such as antioxidants, antiozonates, and talc which is known as a nucleating agent.

It is an important aspect of the present invention to utilize a high shear blending device in order to achieve a mechanically compatible physical blend. By the term "mechanical compatibility," it is meant that no notable macroscopic phase separation is observed by the human eye after processing. High shear blending devices include extruders such as a twin screw extruder, a Buss kneader, and the like. The shear rate of such high shear blending devices is generally at least 750/sec. and desirably at least 1,000/sec. The ingredients are charged into the high shear blender as pellets, or powders, preferably through three feeding ports with the polyurethane and impact modifier being added in one port, the fibers in another port, and the filler through a third port. The processing time should be set so that the residence time is at least one minute, and desirably at least 1.5 minutes and less than 4 minutes. The processing temperature is from about 215° to about 235° C., with from about 215° to about 230° C. being preferred. These temperatures are a decrease of at least 5° C. and desirably at least 10° C. from comparable systems not containing the impact modifier of the present invention. The addition of the carbonyl graft copolymer impact modifier of the present invention results in improved properties such as reduced melt processing viscosity as shown in the following tables.

If a single port feeder is used, all the materials can be charged at the same time, and if a two port feeder is used, the fiber and filler should be added in the same port.

The invention will be better understood by reference to the following examples.

EXAMPLE 1

A series of nonreinforced polyurethane blends with carbony modified polyolefins were prepared using a co-rotating twin-screw extruder (Werner-Pfleider twin screw extruder ZSK-30). About 70 parts by weight of a polyester type thermoplastic elastomer polyurethane essentially made in accordance with U.S. Pat. No. 2,871,218, was fed in the first port. The melt viscosity and various physical properties of the composites are recorded in Tables I through IV.

EXAMPLE 2

A sample of a reinforced polyurethane was prepared using the same extruder as Example 1. The same polyurethane used in Example 1, was used and the melt viscosity and physical properties are recorded in Tables V through VII.

| DESCRIPTION OF COMPOUNDS | |
|---|---|
| TPU-45D | An aromatic polyester type thermoplastic elastomer polyurethane, Shore Hardness 45D, B F Goodrich, made according to U.S. Pat. No. 2,871,218. |
| TPU-55D | An aromatic polyester type thermoplastic elastomer polyurethane, Shore Hardness 55D, B F Goodrich, made according to U.S. Pat. No. 2,871,218. |
| TPU-70D | An aromatic polyester type thermoplastic elastomer polyurethane, Shore Hardness 70D, made according to U.S. Pat. No. 2,871,218. |
| PRO-FAX PC072: | Maleic Anhydride grafted polypropylene Melt Index 12 (Himont, U.S.A., Inc.). |
| PRO-FAX PF 141: | Maleic Anhydride grafted polypropylene Melt Index 4 (Himont, U.S.A., Inc.). |
| Polybond 1001-20MF: | An acrylic acid modified polypropylene (6% grafted glacial acrylic acid, melt index 20 g/10 min.) B P Performance Polymers Inc., Hacketts Town, New Jersey. |

TABLE I

|  | 1A | 1B | 1C | 1D | 1E | 1F | 1G |
|---|---|---|---|---|---|---|---|
| TPU-45D | 100 | 90 | 80 | 90 | 80 | 90 | 80 |
| PROFAX PC 072 |  | 10 | 20 |  |  |  |  |
| PROFAX PF 141 |  |  |  | 10 | 20 |  |  |
| Polybond 1001-20MF |  |  |  |  |  | 10 | 20 |
| Tensile Elongation to Break (%) | 550 | 560 | 560 | 580 | 560 | 560 | 600 |
| Break Strength (psi) | 4200 | 4800 | 6500 | 2900 | 5700 | 2600 | 3100 |
| Flexural Elastic Modulus × 10$^{-3}$ (psi) | 5.7 | 8.6 | 18 | 6.7 | 16 | 7.3 | 9.7 |
| Izod Impact Strength (ft-lb/in.) Unnotched, −30° C. | 28 | 30 | 6 | 25 | 13 | 25 | 43 |
| Melt Shear Viscosity (pa.s) | | | | | | | |
| 210° C. | | | | | | | |
| Shear Rate = 427 sec$^{-1}$ | 918 | 393 | NA | 454 | NA | 492 | NA |
| Shear Rate = 854 sec$^{-1}$ | 546 | 231 | NA | 279 | NA | 284 | NA |
| 220° C. | | | | | | | |
| Shear Rate = 427 sec$^{-1}$ | 459 | 273 | NA | 273 | NA | 295 | NA |

TABLE I-continued

|  | 1A | 1B | 1C | 1D | 1E | 1F | 1G |
|---|---|---|---|---|---|---|---|
| Shear Rate = 854 sec$^{-1}$ | 339 | 164 | NA | 183 | NA | 194 | NA |

TABLE II

|  | 2A | 2B | 2C | 2D | 2E | 2F | 2G |
|---|---|---|---|---|---|---|---|
| TPU-55D | 100 | 90 | 80 | 90 | 80 | 90 | 80 |
| PROFAX PC 072 |  | 10 | 20 |  |  |  |  |
| PROFAX PF 141 |  |  |  | 10 | 20 |  |  |
| Polybond 1001-20MF |  |  |  |  |  | 10 | 20 |
| Tensile elongation to Break (%) | 450 | 440 | 490 | 480 | 440 | 490 | 440 |
| Break Strength (psi) | 2700 | 2900 | 3400 | 3000 | 2700 | 4900 | 3100 |
| Flexural Elastic × 10$^{-3}$ Modulus (psi) | 16.8 | 24.8 | 21.9 | 24.7 | 21.1 | 20.4 | 30.3 |
| Izod Impact Strength (ft-lb/in.) Unnotched, −30° C. | 18 | 29 | 49 | 41 | 35 | 40 | 4 |
| Melt Shear Viscosity (pa.s) 210° C. |  |  |  |  |  |  |  |
| Shear Rate = 427 sec$^{-1}$ | >5.5 × 10$^4$ | 721 | NA | 742 | NA | 930 | NA |
| Shear Rate = 854 sec$^{-1}$ |  | 387 | NA | 426 | NA | 509 | NA |
| 220° C. |  |  |  |  |  |  |  |
| Shear Rate = 427 sec$^{-1}$ | 1116 | 361 | NA | 410 | NA | 448 | NA |
| Shear Rate = 854 sec$^{-1}$ | 645 | 205 | NA | 246 | NA | 273 | NA |

TABLE III

|  | 3A | 3B | 3C | 3D | 3E | 3F | 3G |
|---|---|---|---|---|---|---|---|
| TPU-70D | 100 | 90 | 80 | 90 | 80 | 90 | 80 |
| PROFAX PC 072 |  | 10 | 20 |  |  |  |  |
| PROFAX PF 141 |  |  |  | 10 | 20 |  |  |
| Polybond 1001-20MF |  |  |  |  |  | 10 | 20 |
| Tensile Elongation to Break (%) | 240 | 180 | 280 | 280 | 350 | 220 | 200 |
| Break Strength (psi) | 4300 | 4600 | 5400 | 5400 | 4200 | 4500 | 3700 |
| Flexural Elastic Modulus × 10$^{-3}$ (psi) | 30 | 38 | 54 | 35 | 44 | 42 | 50 |
| Izod Impact Strength (ft-lb/in.) Unnotched, −30° C. | 4.6 | 25 | 12 | 28 | 16 | 30 | 8 |
| Melt Shear Viscosity (pa.s) 220° C. |  |  |  |  |  |  |  |
| Shear Rate = 427 sec$^{-1}$ | 984 | 290 | NA | 328 | NA | 481 | NA |
| Shear Rate = 854 sec$^{-1}$ | 530 | 177 | NA | 218 | NA | 306 | NA |

TABLE IV

|  | 4A | 4B | 4C |
|---|---|---|---|
| PROFAC PC-072 | 100 |  |  |
| PROFAX PF 141 |  | 100 |  |
| Polybond 1001-20MF |  |  | 100 |
| Tensile Elongation To Break (%) | 13 | 20 | 28 |
| Break Strength (psi) | 2300 | 4200 | 3400 |
| Thermal Expansion × 10$^5$ (1/°C.) | 9.1 | 8.7 | 9.5 |
| Flexural Max Stress (× 10$^{-3}$ psi) | 5700 | 6000 | 6600 |
| Elastic Modulus (× 10$^{-3}$ psi) | 190 | 195 | 222 |
| Izod Impact Strength (ft-lb/in.) Unnotched, −30° C. | 3 | 3 | 2 |

TABLE V

|  | 5A | 5B | 5C | 5D |
|---|---|---|---|---|
| TPU-45D | 75 | 65 | 65 | 65 |
| ¼" Glass Fibers | 25 | 25 | 25 | 25 |
| PROFAX PC072 |  | 10 |  |  |
| PROFAX PF 141 |  |  | 10 |  |
| Polybond 1001-20MF |  |  |  | 10 |
| Flexural Modulus (psi) × 10$^{-3}$ | 52 | 101 | 109 | 85 |
| Flexural Stress (psi) × 10$^{-3}$ | 2.1 | 3.3 | 3.5 | 2.9 |
| Specific Gravity (g/cm$^3$) | 1.33 | 1.27 | 1.27 | 1.29 |
| Tensile Yield Strength (psi) | 5700 | 5000 | 5300 | 5800 |
| Izod Impact Strength (ft-lb/in.) Unnotched −30° C. | 33 | 20 | 24 | 31 |

TABLE VI

|  | 6A | 6B | 6C | 6D |
|---|---|---|---|---|
| TPU-55D | 75 | 65 | 65 | 65 |
| ¼" Glass Fibers | 25 | 25 | 25 | 25 |
| PROFAX PC072 |  | 10 |  |  |
| PROFAX PF 141 |  |  | 10 |  |
| Polybond 1001-20MF |  |  |  | 10 |
| Flexural Modulus (psi) × 10$^{-3}$ | 136 | 132 | 140 | 117 |
| Flexural Stress (psi) × 10$^{-3}$ | 4.2 | 4.4 | 4.4 | 3.8 |
| Specific Gravity (g/cm$^3$) | 1.34 | 1.26 | 1.27 | 1.29 |

TABLE VI-continued

|  | 6A | 6B | 6C | 6D |
|---|---|---|---|---|
| Tensile Yield Strength (psi) ($\times 10^{-3}$) | 5.8 | 5.1 | 5.5 | 5.6 |
| Izod Impact Strength (ft-lb/in.) Unnotched 30° | 27 | 24 | 26 | 31 |

TABLE VII

|  | 7A | 7B | 7C | 7D |
|---|---|---|---|---|
| TPU-70D | 75 | 65 | 65 | 65 |
| ¼" Glass Fibers | 25 | 25 | 25 | 25 |
| PC-072 |  | 10 |  |  |
| PF 141 |  |  | 10 |  |
| Polybond 1001-20MF |  |  |  | 10 |
| Flexural Modulus (psi) $\times 10^{-3}$ | 198 | 259 | 212 | 275 |
| Flexural Stress (psi) $\times 10^{-3}$ | 6.6 | 8.2 | 6.7 | 8.4 |
| Specific Gravity (g/cm$^3$) | 1.35 | 1.27 | 1.28 | 1.32 |
| Tensile Yield Strength (psi) $\times 10^{-3}$ | 8.0 | 7.5 | 7.3 | 8.5 |
| Izod Impact Strength (ft-lb/in.) Unnotched −30° C. | 7 | 10 | 9 | 16 |

Tables I, II, and III relate to three different types of polyester-type thermoplastic polyurethanes which were blended with carbonyl modified polyolefins, that is polyolefin graft copolymers. When a soft thermoplastic polyurethane elastomer was utilized, as in Table I, elongation to break properties were generally maintained, break strength was generally improved, the flexural modulus was improved, and the Izod impact strength was generally similar to the control except at high amounts, i.e., about 20 parts by weight. In Table II, when a medium hardness polyurethane elastomer was utilized, similar or improved tensile strength and break strength properties were obtained, as well as improved flex modulus, and unexpectedly improved low temperature impact strength. The use of a fairly hard thermoplastic polyurethane elastomer, as in Table III, generally retained an elongation to break properties, improved break strength, improved flexural modulus, and generally improved the impact strength, especially the low temperature unnotched, impact strength.

Table IV relates to carbonyl modified polyolefin impact modifiers of the present invention which are not blended with any polyurethane. Although flexural modulus was very high, the break strength was low and generally the impact strengths were low. Thus, the blends of the present invention, unexpectedly, improved various physical properties.

Tables V, VI, and VII relate to glass fiber reinforced blends of various thermoplastic polyurethane elastomers and the carbonyl modified polyolefin impact modifiers of the present invention. As apparent from Table V, which relates to a soft thermoplastic polyurethane elastomer, the low temperature impact strength properties were still significant. When a medium hard thermoplastic polyurethane elastomer was utilized, while most physical properties were generally maintained, the low temperature (i.e. −30°0 C.) impact strengths were dramatically and unexpectedly improved. However, when a hard thermoplastic polyurethane elastomer was utilized as in Table VII, good improvements and low temperature impact strength were achieved.

Thus, the data clearly establishes that the use of carbonyl modified polyolefin plastics as impact modifiers is totally unexpected and yet generally achieves improved impact strength, and improved or maintained dimensional stability.

While in accordance with the Patent Statutes, the best mode and preferred embodiment have been set forth, the scope of the invention is not limited thereto, but rather by the scope of the attached claims.

What is claimed is:

1. A polyurethane composition, comprising:
   a thermoplastic elastomer polyurethane having a Shore D hardness of at least 40; and
   an impact modifier which is a polyolefin graft modified with a carbonyl group containing compound to improve the low temperature toughness of said polyurethane, the amount of said polyolefin impact modifier being from about 1 to about 30 parts by weight per 100 parts by weight of said polyurethane.

2. A polyurethane composition as set forth in claim 1, wherein said polyolefin is made from one or more olefin monomers having from 2 to 8 carbon atoms, and wherein said carbonyl group containing compound is an anhydride or carboxylic acid having from 1 to 8 carbon atoms.

3. A polyurethane composition as set forth in claim 2, including from about 0 to about 50 parts by weight of a reinforcing agent per 100 parts by weight of said polyurethane.

4. A polyurethane composition as set forth in claim 3, wherein said reinforcing agent is glass fibers.

5. A polyurethane composition as set forth in claim 2, wherein said one or more olefin monomers forming said impact modifier has 2 or 3 carbon atoms, and wherein said Shore D hardness is at least 50.

6. A polyurethane composition as set forth in claim 5, wherein said amount of said impact modifier is from about 5 to about 15 parts by weight per 100 parts by weight of said polyurethane.

7. A polyurethane composition as set forth in claim 6, wherein said carbonyl group containing compound is an anhydride having from 4 to 8 carbon atoms, and wherein said polyurethane is made from a polyester intermediate.

8. A polyurethane composition as set forth in claim 7, wherein said impact modifier is a copolymer of propylene and ethylene graft modified with from about 0.2 to about 7 percent by weight of maleic anhydride.

9. A polyurethane composition, comprising:
   about 100 parts by weight of a thermoplastic elastomer polyurethane having a Shore D hardness of at least 40;
   from about 1 to about 30 parts by weight of an impact modifier which is a polyolefin graft modified with a carbonyl group containing compound, said carbonyl group containing compound having 1 to 8 carbon atoms and said polyolefin being made from 1 or more monomers having 2 to 8 carbon atoms;
   from about 1 to about 50 parts by weight of a reinforcing fiber; and
   from about 0 to about 40 parts by weight of a filler.

10. A polyurethane composition as set forth in claim 9, wherein said impact modifier is a copolymer of propylene and ethylene graft modified with from about 0.1 to 10 percent by weight of maleic anhydride, and wherein said copolymer has from 1 to 10 percent by weight of ethylene repeating units therein.

11. A polyurethane composition as set forth in claim 9, wherein said impact modifier is a homopolymer of polypropylene graft modified with from 0.1 to 10 percent by weight of maleic anhydride, and wherein said thermoplastic polyurethane elastomer has a Shore D hardness of at least 50.

12. A polyurethane composition as set forth in claim 9, wherein said impact modifier is a copolymer made from ethylene, propylene, and diene monomers wherein said diene has from 4 to 8 carbon atoms and wherein said copolymer is graft modified with maleic anhydride.

13. A polyurethane composition as set forth in claim 11, wherein said reinforcing fiber is glass fiber having a length of about 0.10 to about 1.0 inch, and a diameter of from about 5 to about 20 microns.

14. A polyurethane composition as set forth in claim 9, wherein said polyurethane is the reaction product of a linear hydroxyl terminated polyester of a glycol and a dicarboxylic acid, and an aromatic diisocyanate.

15. A method of heat processing a polyurethane composition, comprising the steps of:
introducing into a heating processing apparatus a thermoplastic elastomer polyurethane having a Shore D Hardness of at least 40, an effective amount of an impact modifier to improve the low temperature toughness and the melt processability of said position, said impact modifier comprising an anhydride modified polyolefin;
blending said ingredients with heating at a temperature from about 215° to about 235° C.; and
discharging said composition from said apparatus.

16. A method of processing a polyurethane composition as set forth in claim 15, wherein said apparatus is an extruding apparatus, and wherein said Shore D hardness of said polyurethane is at least 50.

17. A method of processing a polyurethane composition as set forth in claim 15, wherein said apparatus is an injection molding apparatus, and wherein said Shore D hardness of said polyurethane is at least 50.

* * * * *